United States Patent  [15] 3,685,794
Henning                                [45] Aug. 22, 1972

[54] FLAPPER VALVE ASSEMBLY
[72] Inventor: Donald S. Henning, Thiensville, Wis.
[73] Assignee: Autotrol Corporation, Milwaukee, Wis.
[22] Filed: April 23, 1971
[21] Appl. No.: 136,697

[52] U.S. Cl. .............................................. 251/303
[51] Int. Cl. ................................................ F16k 1/18
[58] Field of Search ...... 239/577, 579; 251/236, 299, 251/303, 335 R

[56] References Cited

UNITED STATES PATENTS
2,313,128   3/1943   Densten ..................... 251/215

Primary Examiner—Henry T. Klinksiek
Attorney—Thomas W. Ehrmann and Barry E. Sammons

[57] ABSTRACT

A flapper valve assembly is disclosed which includes a valve element having a flange of elastic material formed intermediate of a flap portion and an actuating stem. The valve element is inserted through a lateral opening in a valve body with the flange disposed against a mounting surface which surrounds the lateral opening and with the flap portion opposing a valve seat in the valve body. The flange is clamped in place upon the mounting surface by a closure member which is secured to the valve body so that the flange seals the lateral opening in the valve body. The flange provides a flexible pivot for the movement of the flap portion toward and away from the valve seat in response to movement of the stem. The flange is formed normal to the flap portion and the mounting surface is inclined toward the valve seat so that the flap portion will be held away from the valve seat when the valve element is in a neutral position with the flange in a relaxed condition. A spring is connected to the stem to urge the flap portion against the valve seat thereby closing the valve. The valve is opened by moving the stem, against the force of the spring, so that the flap portion is pivoted from its closed position, through the neutral position and into a fully opened position.

4 Claims, 3 Drawing Figures

PATENTED AUG 22 1972   3,685,794

INVENTOR
DONALD S. HENNING

BY

*Thomas W. Thurman*

ATTORNEY

3,685,794

FLAPPER VALVE ASSEMBLY

BACKGROUND OF THE INVENTION

1. Field of the Invention

The invention relates to flapper valve assemblies, and particularly to an improved flapper valve assembly of the type which utilizes a valve element with an elastic mounting that permits the valve element to be pivoted toward and away from a valve seat.

2. Description of the Prior Art

Flapper valves are known which employ an elastic pivot mounting for a rigid valve element that has a flap portion which extends into a valve body to work against a valve seat and an outwardly projecting actuating stem. The pivot mounting may be formed integral with the rigid valve element as in U.S. Pat. No. 2,809,800 to Ahl where leakage is a consideration, or it may be formed separate from the rigid valve element as in U.S. Pat. No. 2,539,559 to Ward where leakage is not a prime consideration. Valves of this general type provide an inexpensive but effective on-off fluid control.

In such flapper valves there is a normal position which the valve element will assume when the pivot mounting is in an unstressed or relaxed condition. This normal, or neutral, position may have the sealing portion disposed away from the valve seat when it is desired to have the valve normally open, as in U.S. Pat. No. 2,539,559. More commonly, the neutral position of the valve element has the sealing portion closed against the seat to normally close the valve, as in U.S. Pat. No. 2,809,800. In the normally closed type of flapper valve there is a practical limit to the extent to which the pivot mounting may be flexed to remove the flap portion from the valve seat. This limit is fixed by the extent to which the pivot mounting may be flexed before it fails structurally or is dislodged from its mounting. The limit is also fixed by the force required to deform the pivot mounting beyond a limited degree. That is, the force required to flex the pivot mounting increases as the deformation of the pivot mounting increases. This later consideration is a particular problem when the valve is required to be opened by a limited force such as would be applied by a cam in an automatic control. Thus, in known flapper valves the valve element can be pivoted away from the valve seat to only a limited degree and, as a result, the flap portion presents a significant obstruction to the flow of fluid through the valve.

It is a principal object of this invention to provide a flapper valve assembly which eliminates this operational deficiency by increasing the degree of pivoting of the valve element which can be accomplished by the application of a moderate force and without fear of structural failure of the pivot mounting.

SUMMARY OF THE INVENTION

A flapper valve assembly includes a valve element having a flap extending into a valve body in opposition to an interior valve seat, an elastic mounting portion projecting laterally from the flap and clamped to the valve body, and an actuating stem projecting outwardly of the valve body, the mounting portion being adapted to flex upon the application of a force to the stem to provide a pivot point for the valve element and the valve element being so mounted on the valve body that the flap is away from the seat when the mounting portion is relaxed, together with biasing means normally flexing the mounting portion in one direction to pivot the valve member to a closed position in which the flap is against the valve seat, whereby the application of a force on the stem counter to the biasing means will flex the mounting portion in the opposite direction and pivot said valve element to a fully open position.

Preferably the mounting portion comprises a flange of natural or synthetic rubber which projects perpendicular of the flap and which is formed integral with the flap and the stem.

DESCRIPTION OF THE PREFERRED EMBODIMENT

Figure 1:
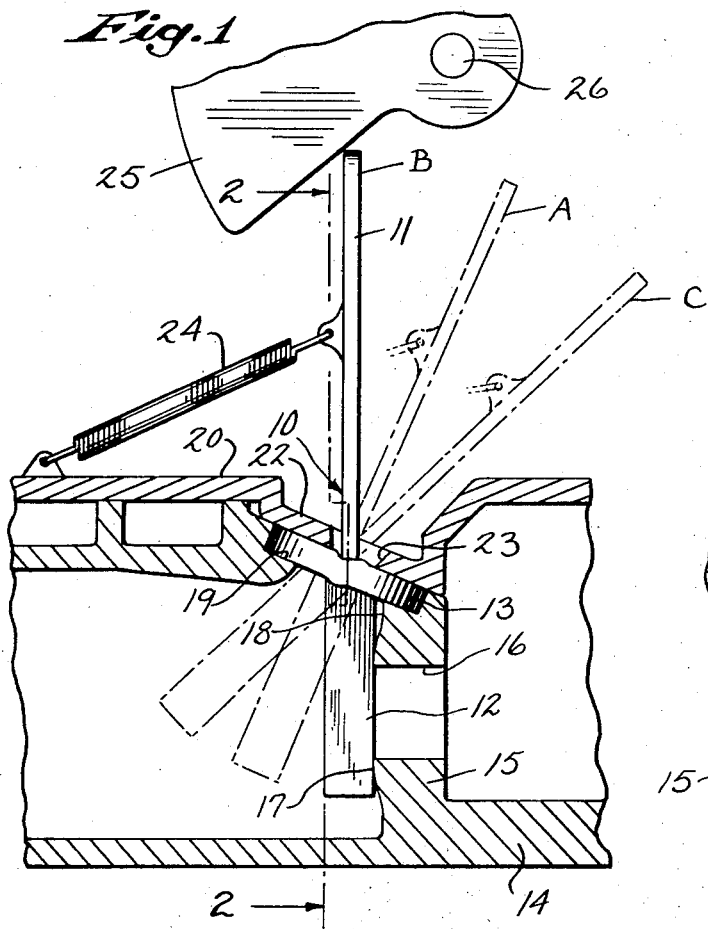
FIG. 1 is a view in elevation of the flapper valve assembly in accordance with the invention, with the structure forming the valve body being shown in section.
Figure 2:
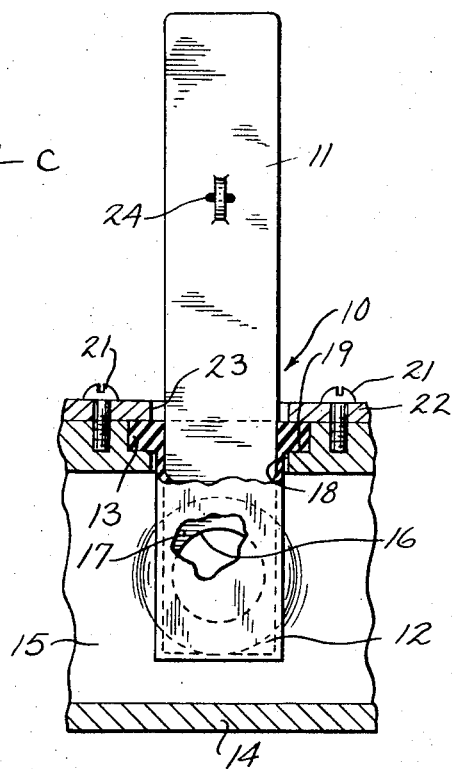
FIG. 2 is a view in vertical section taken in the plane of the line 2—2 of FIG. 1.
Figure 3:
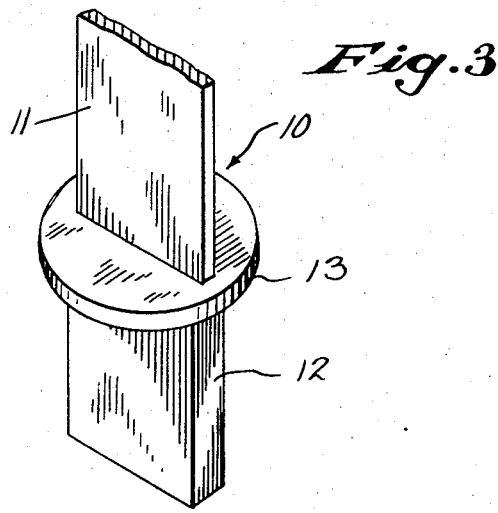
FIG. 3 is a view in perspective of the valve element of the flapper valve assembly.

Referring to the drawings, a valve element 10 is formed with a central elongated metal stem 11 which is enshrouded at one end by an elastic material, such as a natural or synthetic rubber, to define a flap portion 12. The valve element 10 also has a mounting portion in the form of a disc-like flange 13 of elastic material which projects perpendicularly from the stem. The flange 13 separates the flap portion 12 from the outwardly extending stem 11. Preferably, the elastic material forming the selling portion 12 and the flange 13 is molded in one piece to the stem 11 to form an integral unit.

The valve element 10 is mounted in a valve body 14 having a partition 15 with a valve port 16 surrounded by a valve seat 17. The valve body 14 has a lateral opening 18 above the valve seat 17 through which the flap portion 12 projects into the valve body in opposition to the valve seat 17. The underside of the flange 13 is located upon a mounting surface 19 on the valve body 14 which surrounds the lateral opening 18. The mounting surface 19 is inclined toward the valve seat 17 so that the valve element 10 is aligned in the position A illustrated in phantom lines in FIG. 1 when in a relaxed, or unstressed, condition. In that position, the flap portion 12 of the valve element 10 is disposed away from the valve seat 17.

A closure member 20 is secured to the body 14 by screws 21, or in any other suitable manner. The closure member 20 cooperates with the body 14 to define fluid passages on either side of the partition 15 and includes a clamping portion 22 which overlies the flange 13 and has an opening 23 to accommodate the outwardly extending stem 11. The flange 13 is thereby clamped between the closure member 20 and the valve body 14 to hold the flange in place, and to have the flange 13 function to seal off the lateral opening 18 in the valve body 14. A one piece valve body with a separate clamping member secured to the valve body could be employed in place of the structure shown, if desired.

The flange 13 functions as a pivot mounting for the valve element 10. That is, as the stem 11 is moved in either direction from the position A, the flange 13 will flex to act as a fulcrum for the valve element 10. A bias spring 24 is connected between the outwardly projecting stem 11 and the closure member 20 to normally urge the stem 11 to an upright position and thereby hold the valve element 10 in a closed position B (shown in solid lines in FIG. 1) in which the flap portion 12 is seated against the valve seat 17. In opening the valve, a valve actuator, which may take the form of a timing cam 25 driven by a cam shaft 26, engages the stem 11 and pivots the valve element 10 against the urging of the bias spring 24 to a fully open position C (shown in phantom lines in FIG. 1).

In moving from the closed position B to the fully open position C, the valve element 10 passes through the neutral position A and the flange 13 is changed from a condition in which it is flexed in one direction to a condition in which it is flexed in the other direction. There is a limit to the degree to which the flange 13 may be flexed before the flange 13 will fail structurally or be torn loose from its mounting on the valve body 14. The amount of actuating force available to be applied to the stem 11 provides a further practical limit to the degree to which the flange 13 may be flexed because the force required to pivot the valve element 10 will increase as the valve element is moved farther away from its relaxed, neutral position. For given sizes of flapper valves and available actuating forces, the allowable degree of pivoting can be established which will not encroach on either of the limits of flange integrity or available actuating force.

In the embodiment illustrated, the practical limit of pivoting is about 22°. The mounting surface 19 is thereby disposed at an angle of 22° from the horizontal. Thus, in the preferred embodiment, it is possible to pivot the valve element 10 through a total arc of nearly 45°, as compared with prior art devices which would be opened through an arc of only half that amount. This results in a much more complete opening of the valve with the result that the flap portion 12 presents considerably less obstruction to the flow of fluid through the valve port 16 than would otherwise be possible.

I claim:

1. A flapper valve assembly comprising:
   a valve body including a valve seat surrounding a valve port;
   a valve element having a flap portion extending into said valve body in opposition to said valve seat, an elastic mounting portion projecting laterally from said flap portion and clamped to said valve body, and an actuating stem projecting outwardly of said valve body;
   said mounting portion being adapted to flex upon the application of a force to said stem to provide a fulcrum for said valve element, and said valve element being so mounted on said valve body that said flap portion is disposed away from said valve seat when said mounting portion is relaxed; and
   biasing means normally flexing said mounting portion in one direction to pivot said valve element to a closed position in which said flap portion is against said valve seat,
   whereby the application of a force on said stem counter to said biasing means will flex said mounting portion in the opposite direction and pivot said valve element to a fully open position.

2. A flapper valve assembly comprising:
   a valve body including a valve seat surrounding a valve port and a lateral opening adjacent said valve seat;
   a valve element having a flap portion extending into said valve body through said opening and opposing said valve seat, an elastic flange overlying said opening, and an actuating stem projecting in the opposite direction from said sealing portion;
   a closure member surrounding said stem and overlying said flange, said closure member being secured to said valve body to clamp said flange between said member and said body in a neutral position in which said flap portion is away from said valve seat;
   said flange being adapted to flex for pivoting of said valve element from said neutral position toward and away from said seat;
   and biasing means normally pivoting said valve element from said neutral position to a closed position with said flap portion against said seat and adapted to be overcome by the application of an opposing force on said stem to pivot said valve element from said closed position and through said neutral position to a fully opened position.

3. A valve assembly in accordance with claim 2 wherein said flange projects perpendicularly from said valve element and wherein said valve body has a flange mounting surface disposed about said opening and inclined toward said seat, whereby said flange will hold said valve element in said neutral position when no net force is exerted on said stem.

4. A valve assembly in accordance with claim 3 wherein said biasing means comprises a spring connected between said stem and said valve body.

* * * * *